United States Patent
Kadowaki

(10) Patent No.: US 12,054,050 B2
(45) Date of Patent: Aug. 6, 2024

(54) VIBRATION PROOFING DEVICE

(71) Applicant: YAMASHITA RUBBER CO., LTD., Fujimino (JP)

(72) Inventor: Hirokazu Kadowaki, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 372 days.

(21) Appl. No.: 17/617,510

(22) PCT Filed: Jun. 2, 2020

(86) PCT No.: PCT/JP2020/021701
§ 371 (c)(1),
(2) Date: Dec. 8, 2021

(87) PCT Pub. No.: WO2020/250744
PCT Pub. Date: Dec. 17, 2020

(65) Prior Publication Data
US 2023/0052631 A1 Feb. 16, 2023

(30) Foreign Application Priority Data
Jun. 11, 2019 (JP) .................... 2019-108956

(51) Int. Cl.
*B60K 5/12* (2006.01)
*F16F 13/10* (2006.01)

(52) U.S. Cl.
CPC .......... *B60K 5/1208* (2013.01); *F16F 13/101* (2013.01); *F16F 13/103* (2013.01); *F16F 13/108* (2013.01)

(58) Field of Classification Search
CPC ....... F16F 13/103; F16F 13/108; F16F 13/101
See application file for complete search history.

(56) References Cited

U.S. PATENT DOCUMENTS

| 6,409,158 B1 | 6/2002 | Takashima et al. |
| 2004/0239020 A1 | 12/2004 | Ito |

(Continued)

FOREIGN PATENT DOCUMENTS

| CN | 102588501 | 7/2012 |
| CN | 107461448 | 12/2017 |

(Continued)

OTHER PUBLICATIONS

Japanese Office Action dated May 24, 2022, English abstract included, 9 pages.

(Continued)

*Primary Examiner* — Melanie Torres Williams
(74) *Attorney, Agent, or Firm* — Rankin, Hill & Clark LLP

(57) ABSTRACT

A vibration proofing device (10) includes an insulator (50) interposed between a first attaching member (30) and a second attaching member (40), and is disposed in an internal space (95) of a second bracket (90). The first attaching member (30) is formed to have two side walls (33, 33) parallel to each other to face the inner face of the second bracket (90). The second attaching member (40) is a tubular member having an opening (41a) passing therethrough in an upper-lower direction. At least one of side edge portions of each side wall (33) is disposed outside the opening (41a) of the second attaching member (40). Each side wall (33) is provided on an outer face thereof with a stopper (51) made of an elastic material. With this configuration, it is possible to sufficiently absorb an impact shock resulting from the stopper (51) hitting the second bracket (90).

6 Claims, 5 Drawing Sheets

(56) References Cited

U.S. PATENT DOCUMENTS

| | | |
|---|---|---|
| 2009/0079115 A1 | 3/2009 | Yoshii et al. |
| 2010/0059912 A1 | 3/2010 | Takakura |
| 2014/0284858 A1 | 9/2014 | Sakata |
| 2015/0252866 A1* | 9/2015 | Muraoka .............. F16F 13/085 267/140.13 |
| 2016/0238102 A1 | 8/2016 | Goto et al. |

FOREIGN PATENT DOCUMENTS

| | | | |
|---|---|---|---|
| JP | 2001-280404 | 10/2001 | |
| JP | 2004-353832 | 12/2004 | |
| JP | 2008-132846 | 6/2008 | |
| JP | 2008-223836 | 9/2008 | |
| JP | 2009-074659 | 4/2009 | |
| JP | 2014-181775 | 9/2014 | |
| JP | 2016-075343 | 5/2016 | |
| JP | 2016-109216 | 6/2016 | |
| WO | WO-2015037366 A1 * | 3/2015 | ............. F16F 13/08 |

OTHER PUBLICATIONS

International Search Report, Date of mailing: Jul. 7, 2020, 2 pages.

\* cited by examiner

FIG. 5
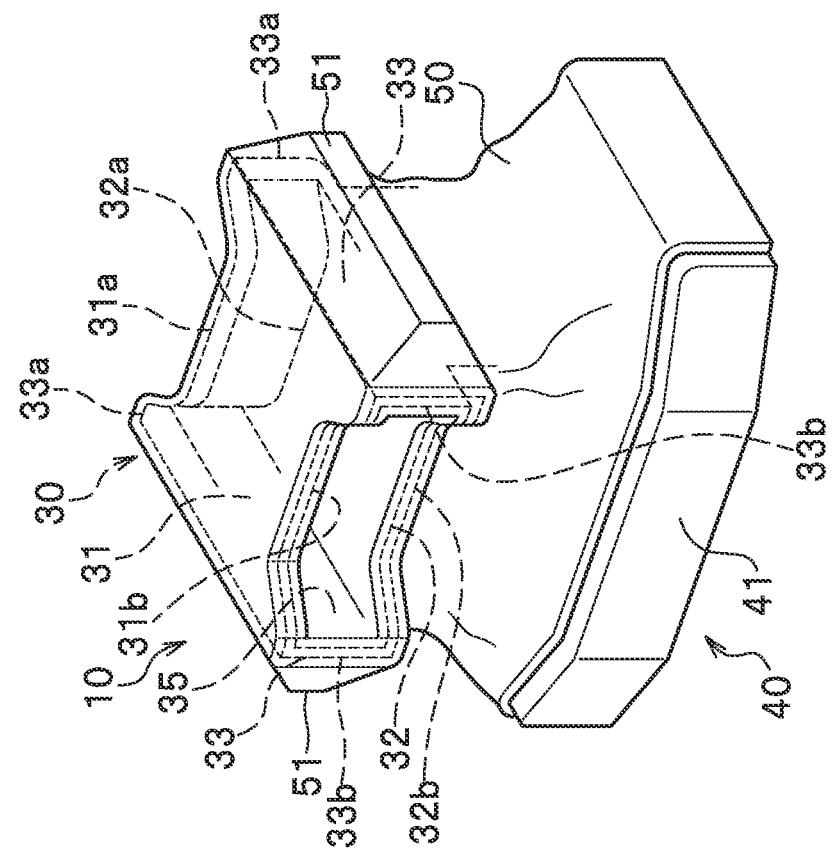
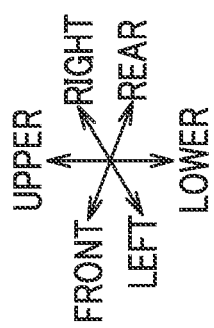

VIBRATION PROOFING DEVICE

TECHNICAL FIELD

The present invention relates to a vibration proofing device.

BACKGROUND ART

A vibration proofing device to support a prime mover such as an engine or a motor in an automobile on the vehicle body is interposed between a first bracket to be attached to the prime mover and a second bracket to be attached to the vehicle body.

The vibration proofing device includes a first attaching member to be attached to the first bracket, a second attaching member to be attached to the second bracket, and an insulator interposed between the first attaching member and the second attaching member.

The first attaching member is a tubular member having an attaching hole passing therethrough and is embedded in an upper end portion of the insulator by insert molding. A connecting portion of the first bracket is inserted into the attaching hole of the first attaching member, so that the first attaching member is attached to the prime mover.

In the structure disposed the vibration proofing device in an internal space of the second bracket, stoppers are provided on outer faces of side walls of the first attaching member (for example, refer to patent literature 1). Each stopper is an elastic member formed of a portion of the insulator and is a buffer member to prevent the first attaching member from hitting an inner face of the second bracket.

PRIOR ART LITERATURE

Patent Literature

Patent literature 1: JP 2016-075343 A

SUMMARY OF THE INVENTION

Problems to be Solved by the Invention

In the vibration proofing device describe above, in a case where the spring constant of each stopper is small, there is a concern that each stopper cannot sufficiently absorb an impact shock when it hits the second bracket.

An object of the present invention is to provide a vibration proofing device which can effectively absorb an impact shock when each stopper hits the second bracket to solve the problem.

Means for Solving the Problems

In order to solve the problem, the present invention provides a vibration proofing device includes a first attaching member to be attached to a first bracket; a second attaching member to be attached to a second bracket; and an insulator interposed between the first attaching member and the second attaching member. The vibration proofing device is disposed in an internal space of the second bracket. The first attaching member is formed to have two side walls parallel to each other to face an inner face of the second bracket. The second attaching member is a tubular member having an opening passing therethrough in an upper-lower direction. At least one of side edge portions of each side wall is disposed outside the opening of the second attaching member, and each side wall is provided on an outer face thereof with a stopper made of an elastic material.

In the vibration proofing device of the present invention, a cross section of each stopper can be enlarged by making the corresponding side wall of the first attaching member larger. And by making a volume of each stopper larger, the spring constant can be enlarged. Thus, the increase of the displacement amount of each stopper becomes gradual relative to the increase of the load on the corresponding stopper when the corresponding stopper hits the second bracket, so that each stopper can effectively absorb an impact shock when the corresponding stopper hits the second bracket.

In the vibration proofing device described above, the first attaching member has an attaching hole surrounded by the two side walls, a top plate, and a bottom plate, and there is a case where the first bracket is attached into the attaching hole from one end portion of the first attaching member toward the other end portion thereof. In this case, it is preferable that the first attaching member is formed in such a shape that a part from a center of a width of the first attaching member in an attaching direction in which the first bracket is attached over to the other end portion is larger than the other part from the center over to the one end portion in the attaching direction of the first bracket.

Thus, by largely lengthening each side wall toward a side opposite to an attaching side of the first bracket, each side wall can be sufficiently enlarged while avoiding interferences between the corresponding side wall and the first bracket.

It is preferable that in the vibration proofing device described above, the two side walls project in the attaching direction of the first bracket relative to the top plate and the bottom plate.

Thus, by recessing the top plate and the bottom plate relative to end portions of the two side walls, each side wall can be enlarged while suppressing the weight increase of the first attaching member.

Effect of the Invention

According to the vibration proofing device of the present invention, the spring constant of each stopper can be enlarged by enlarging the volume thereof, so that each stopper can effectively absorb an impact shock when the corresponding stopper hits the second bracket.

BRIEF DESCRIPTION OF THE DRAWINGS

FIG. 5 is a perspective view showing the vibration proofing device according to the embodiment of the present invention.

MODE FOR CARRYING OUT THE INVENTION

An embodiment of the present invention will be described in detail appropriately with reference to drawings.

In the following description, an upper-lower direction, a front-rear direction, and a left-right direction are set for convenience in describing a vibration proofing device of the embodiment, and do not limit a configuration and an installation state of the vibration proofing device of the present invention.

Figure 2:
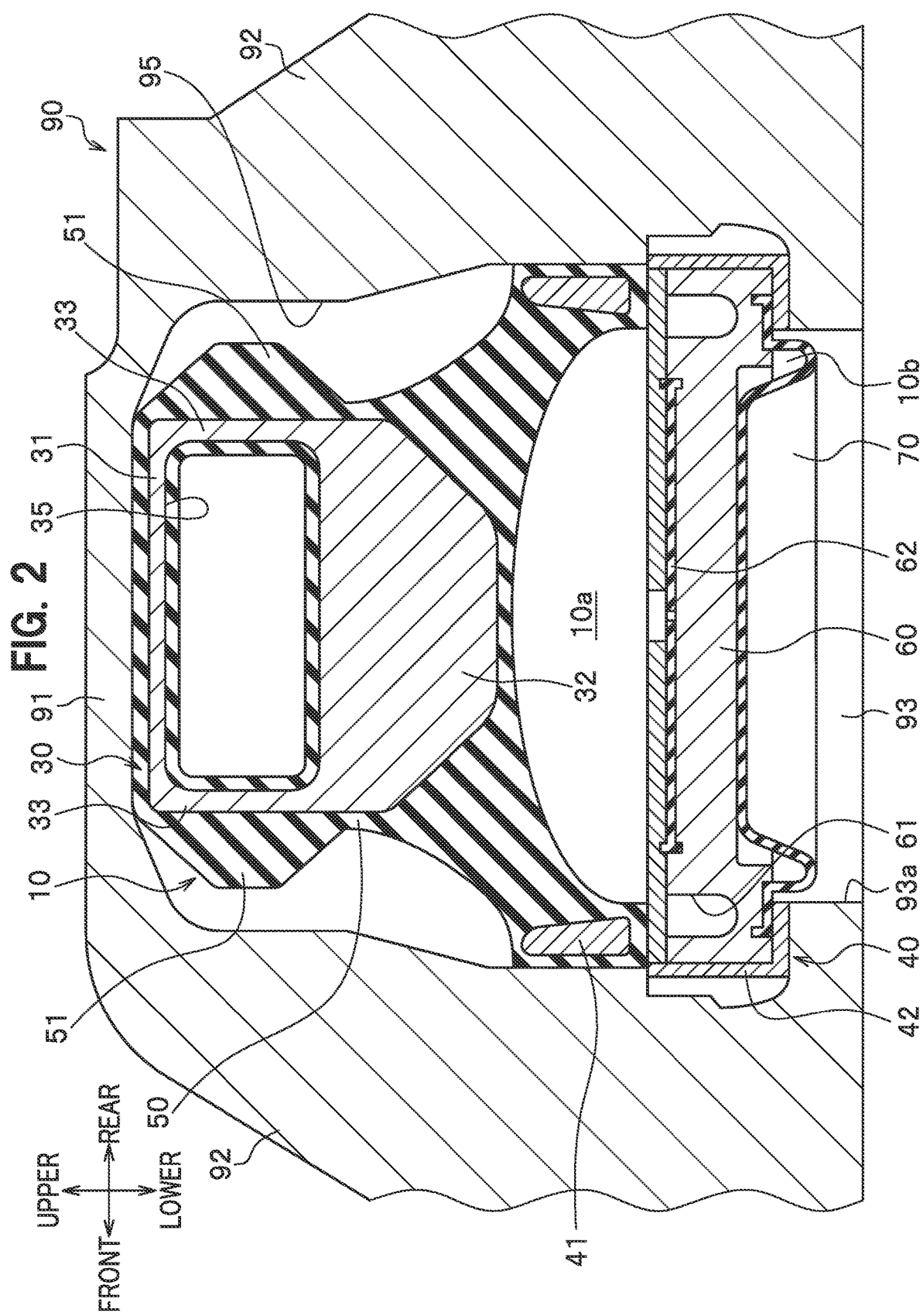
FIG. 2 is a cross sectional view taken along an arrow line II-II in FIG. 1 and showing the vibration proofing device and the brackets according to the embodiment of the present invention.

In the embodiment, an upper side of the sheet of FIG. 2 is upper and a lower side of the sheet of FIG. 2 is lower. And, both left and right sides of the sheet of FIG. 2 make the front-rear direction.

Further, a direction orthogonal to the upper-lower direction and the front-rear direction shown in FIG. 2 is the left-right direction, and a posterior side of the sheet of FIG. 2 is a right side and an anterior side of the sheet of FIG. 2 is a left side.

Figure 1:
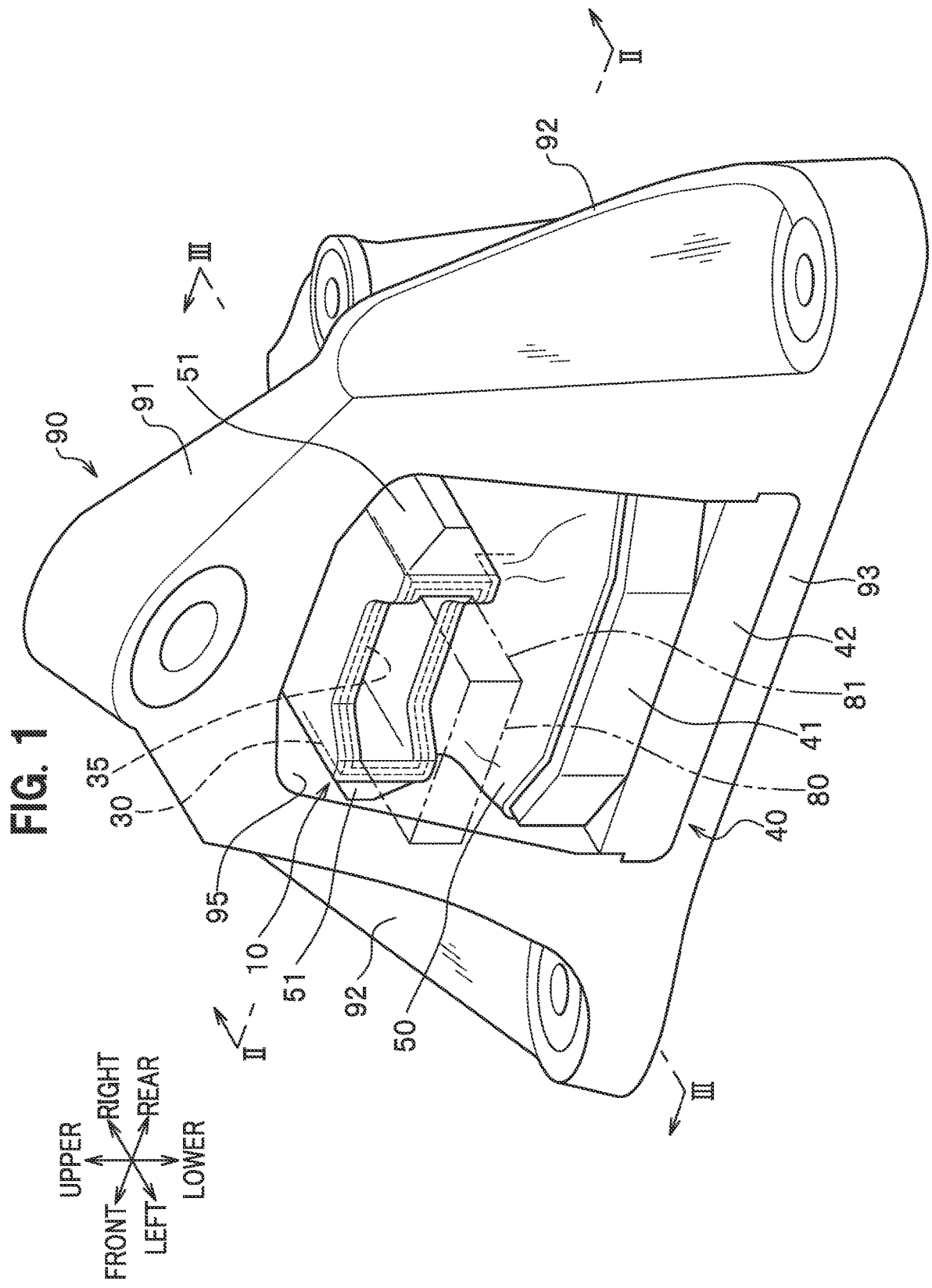
FIG. 1 is a perspective view showing a vibration proofing device and brackets according to an embodiment of the present invention.

As shown in FIG. 1, in the embodiment, a direction in which a first bracket 80 is attached to a first attaching member 30 of a vibration proofing device 10 is set as the left-right direction.

Furthermore, in each figure of the embodiment, each portion of the vibration proofing device 10 is shown by appropriate exaggeration and simplification in order to clear the feature of the present invention.

As shown in FIG. 1, the vibration proofing device 10 of the embodiment is interposed between, for example, an engine and the vehicle body of a vehicle such as an automobile. Hereinafter, the engine is described as an object for the vibration proofing.

The vibration proofing device 10 is interposed between the first bracket 80 to be attached to the engine and a second bracket 90 to be attached to the vehicle body.

The second bracket 90 is a member made of resin or metal and is attached to the vehicle body. The second bracket 90 of the embodiment is a member made of resin.

Figure 4:
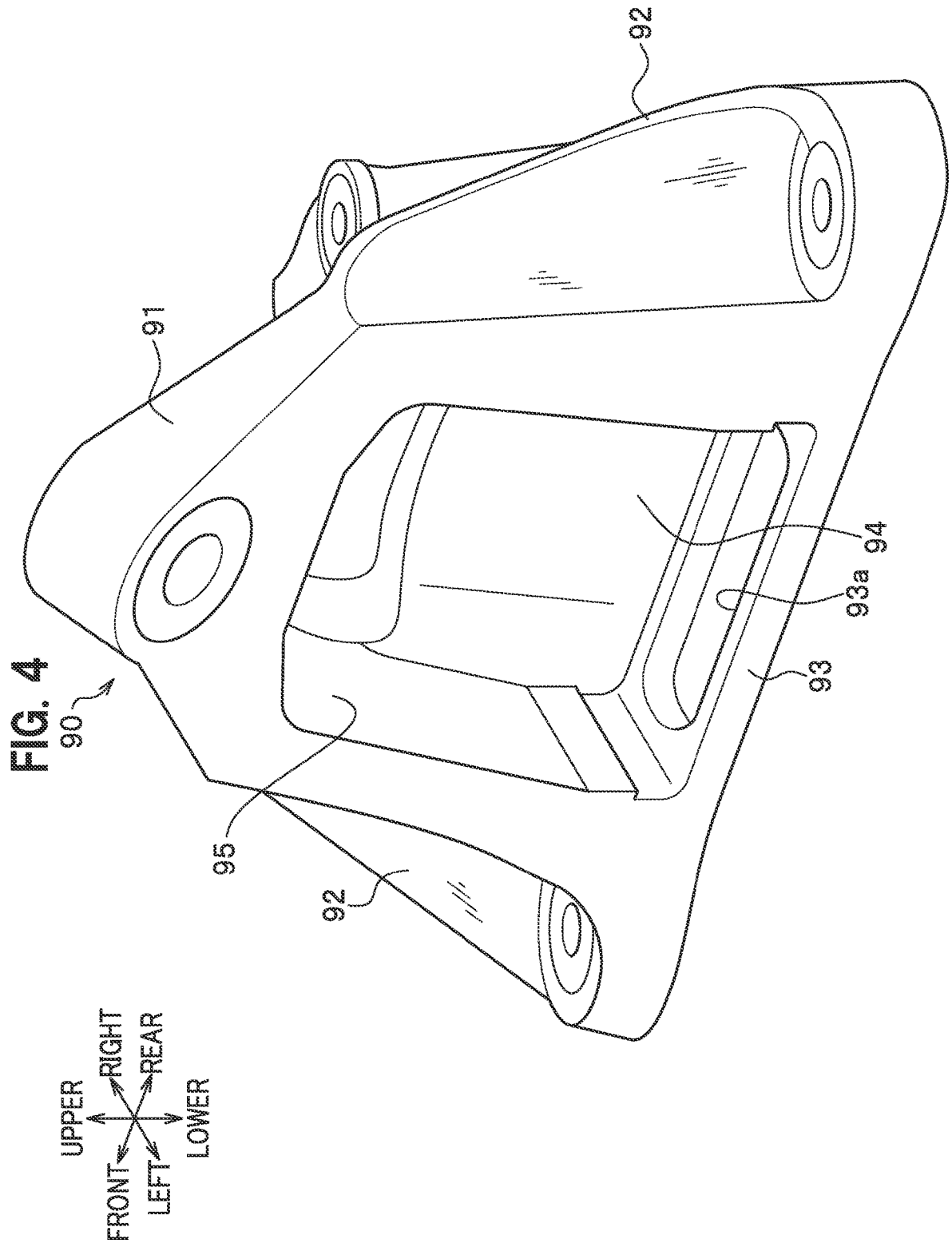
FIG. 4 is a perspective view showing a second bracket for the vibration proofing device according to the embodiment of the present invention.

As shown in FIG. 4, the second bracket 90 includes a top portion 91, front and rear leg portions 92, 92 lengthening from the top portion 91 downward, a bottom portion 93 formed between lower end portions of the leg portions 92, 92, and a right wall portion 94 standing on a right edge portion of the bottom portion 93. An opening 93a is formed to pass through a central portion of the bottom portion 93 in the upper-lower direction. A left end portion of the top portion 91 and a lower end portion of each leg portion 92 are portions to be attached to the vehicle body.

In the second bracket 90, an internal space 95 is formed between the leg portions 92, 92. The internal space 95 is a space surrounded by the top portion 91, the leg portions 92, 92, and the bottom portion 93. The internal space 95 is open to a left face and a right face of the second bracket 90.

As shown in FIG. 1, the vibration proofing device 10 is disposed in the internal space 95 of the second bracket 90. The vibration proofing device 10 of the embodiment is a liquid sealing type vibration proofing device.

As shown in FIG. 2, the vibration proofing device 10 includes the first attaching member 30, a second attaching member 40, an insulator 50 interposed between the first attaching member 30 and the second attaching member 40, a partitioning member 60 disposed under the insulator 50 and a diaphragm 70 disposed under the insulator 50.

The first attaching member 30 is a metal member embedded in an upper portion of the insulator 50 by insert molding. The first attaching member 30 is formed in a rectangle tubular shape formed of a top plate 31, a bottom plate 32, and front and rear side walls 33, 33. An attaching hole 35, which is surrounded by the top plate 31, the bottom plate 32, and the front and rear side walls 33, 33, is formed to pass through the first attaching member 30 in the left-right direction.

Figure 3:
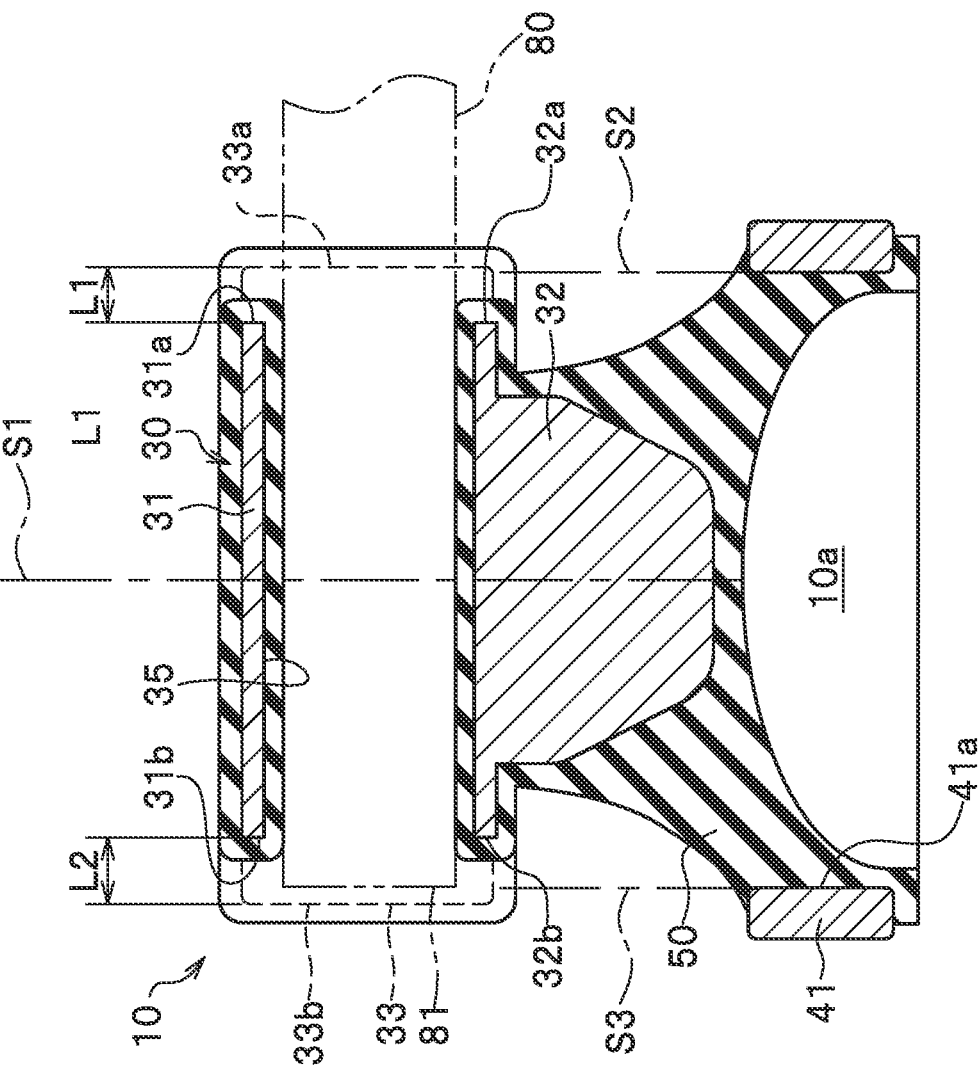
FIG. 3 is a cross sectional view taken along an arrow line III-III in FIG. 1 and showing the vibration proofing device and the brackets according to the embodiment of the present invention.

As shown in FIG. 3, a connecting portion 81 of the first bracket 80 attached to the engine is inserted into the attaching hole 35 of the first attaching member 30 from the right side. That is, the connecting portion 81 is attached into the attaching hole 35 of the first attaching member 30 from a right end portion of the first attaching member 30 toward a left end portion thereof. Thus, the first attaching member 30 is attached to the engine.

As shown in FIG. 2, the second attaching member 40 includes an upper member 41 embedded in a lower end portion of the insulator 50 by insert molding and a lower member 42 disposed under the upper member 41.

Note that, each of the upper member 41 and the lower member 42 of the embodiment is a resin member, but it may be a metal member.

The upper member 41 is a rectangular tubular member and has an opening 41a passing therethrough in the upper-lower direction. Front and rear side faces of the upper member 41 are respectively pressed to inner faces of the leg portions 92, 92 of the second bracket 90. Thus, the upper member 41 is fixed to the second bracket 90.

The lower member 42 is a rectangular tubular member and has a bottom portion. A central portion of the bottom portion of the lower member 42 is open in the upper-lower direction.

The insulator 50 is an elastic member made of rubber. Note that, the insulator 50 of the embodiment may be made of various kinds of rubber materials.

The first attaching member 30 is embedded in the upper end portion of the insulator 50 by insert molding, and the upper end portion of the insulator 50 is formed in a rectangle tubular shape. The lower end portion of the insulator 50 is formed in a rectangular tubular shape along an outer peripheral wall portion of the upper member 41. The insulator 50 has a space in a lower portion thereof, the space being open at a lower face of the insulator 50.

The partitioning member 60 is fitted in the lower member 42. The opening in the lower portion of the insulator 50 is closed by the partitioning member 60.

A main liquid chamber 10a is formed above the partitioning member 60. The main liquid chamber 10a is a space surrounded by an inner face of the lower portion of the insulator 50 and an upper face of the partitioning member 60, and an incompressible operational liquid is sealed therein.

The diaphragm 70 is disposed under the partitioning member 60. The diaphragm 70 is formed of a rubber membrane. An outer peripheral edge portion of the diaphragm 70 is sandwiched between the lower member 42 and a lower face of the partitioning member 60.

A sub-liquid chamber 10b is formed between the partitioning member 60 and the diaphragm 70. The sub-liquid chamber 10b is a space surrounded by the lower face of the partitioning member 60 and an upper face of the diaphragm 70, and the incompressible operational liquid is sealed.

An orifice passage 61 to communicate the main liquid chamber 10a with the sub-liquid chamber 10b is formed in the partitioning member 60. When vibrations are input into the first attaching member 30, a liquid column resonance occurs between the main liquid chamber 10a and the sub-liquid chamber 10b by the operational liquid passing through the orifice passage 61, so that the vibrations are effectively damped.

Further, an elastic movable membrane 62 is disposed on the central portion of the partitioning member 60. Internal pressure fluctuations in the main liquid chamber 10a are absorbed by the elastic deformation of the elastic movable membrane 62 according to the internal pressure fluctuations in the main liquid chamber 10a.

In the first attaching member 30 of the embodiment, front and rear side walls 33, 33, each of which faces an inner face of the corresponding one of the leg portions 92, 92 of the second bracket 90, are formed in parallel to each other. The front and rear side walls 33, 33 are symmetrical in shape in the front-rear direction.

As shown in FIG. 3, in the embodiment, the first bracket 80 is attached to the first attaching member 30 from the right side. In the following description, a right edge portion of each side wall 33 is referred to as a first edge portion 33a, the right edge portion being on a side where the first bracket 80 is attached, and a left edge portion thereof is referred to as a second edge portion 33b, the left edge portion being on the opposite side.

As shown in FIG. 5, in the embodiment, the first edge portion 33a of each side wall 33 projects relative to an edge portion 31a of the top plate 31 and an edge portion 32a of the bottom plate 32. Furthermore, the second edge portion 33b of each side wall 33 projects rearward relative to an edge portion 31b of the top plate 31 and an edge portion 32b of the bottom plate 32.

The first attaching member 30 is formed in such a form that the top plate 31 and the bottom plate 32 are recessed relative to the edge portions of the side walls 33, 33 in the left-right direction.

As shown in FIG. 3, the first edge portion 33a of each side wall 33 is disposed outside a vertical virtual plane S2 which includes an edge portion of the opening 41a of the upper member 41 and which is orthogonal to the left-right direction.

Further, the second edge portion 33b of each side wall 33 is disposed outside a vertical virtual plane S3 which includes an edge portion of the opening 41a of the upper member 41 and which is orthogonal to the left-right direction.

That is, the first edge portion 33a and the second edge portion 33b of each side wall 33 are disposed outside the opening 41a of the upper member 41 in plan view.

Thus, the left-right direction length of each side wall 33 is larger than the left-right direction length of the opening 41a. In the embodiment, the left-right direction length of each side wall 33 is set to be equal to or similar to the front-rear direction length of the opening 41a.

In a case where each side wall 33 is divided into a left part and a right part by a boundary defined by a vertical virtual plane S1 which includes the left-right direction center of the opening 41a and which is orthogonal to the left-right direction, the left part of each side wall 33 is larger in the left-right direction than the right part of the corresponding side wall 33. That is, the first attaching member 30 is formed in such a shape that the part from the width center in the attaching direction of the first bracket 80 over to the left end portion is larger in the attaching direction of the first bracket 80 than the part from the width center over to the right end portion.

A left-right direction length L2 from the edge portion 31b of the top plate 31 to the second edge portion 33b of each side wall 33 is larger than a left-right direction length L1 from the edge portion 31a of the top plate 31 to the first edge portion 33a of the side wall 33.

As shown in FIG. 2, front and rear stoppers 51, 51 are provided on respective outer faces of the side walls 33, 33 of the first attaching member 30. Each stopper 51 is an elastic member portion formed of a portion of the insulator 50. The front and rear stoppers 51, 51 are symmetrical in shape in the front-rear direction.

Each stopper 51 is a cushioning member to prevent the first attaching member 30 from hitting the inner face of the second bracket 90 when the first attaching member 30 is vibrated.

As shown in FIG. 5, each stopper 51 of the embodiment is a hexahedron lengthened in the left-right direction and formed from the first edge portion 33a of the corresponding side wall 33 over to the second edge portion 33b thereof. Each stopper 51 of the embodiment is formed in a pyramid trapezoidal shape that a cross section thereof becomes smaller with increasing distance from the outer face of the corresponding side wall 33 toward the outside in the front-rear direction. That is, a cross section orthogonal to a left-right direction axis of each stopper 51 is a trapezoid.

As shown in FIG. 1, the vibration proofing device 10 described in the above includes the first attaching member 30 to be attached to the first bracket 80, the second attaching member 40 to be attached to the second bracket 90, and the insulator 50 interposed between the first attaching member 30 and the second attaching member 40. The vibration proofing device 10 is disposed in the internal space of the second bracket 90. The first attaching member 30 has two side walls 33, 33 which face the inner face of the second bracket 90 and are parallel to each other. As shown in FIG. 3, the second attaching member 40 is a tubular member through which the opening 41a passes in the upper-lower direction. The side edge portions of each side wall 33 are disposed outside the opening 41a of the second attaching member 40. As shown in FIG. 2, each stopper 51 of an elastic member is provided on the outer face of the corresponding side wall 33.

As shown in FIG. 5, in the vibration proofing device 10 of the embodiment, each stopper 51 can have a larger cross section orthogonal to the front-rear direction by lengthening the corresponding side wall 33 of the first attaching member 30 in the left-right direction. And further, by enlarging the volume of each stopper 51, the spring constant thereof can be made larger.

Thereby, the increase in the deformation amount of each stopper 51 is lowered compared to the load increase thereon when the corresponding stopper 51 hits the inner face of the second bracket 90. Therefore, each stopper 51 can effectively absorb an impact shock when the stopper 51 hits the inner face of the second bracket 90.

As shown in FIG. 3, the attaching hole 35 surrounded by the side walls 33, 33, the top plate 31 and the bottom plate 32 is formed in the first attaching member 30 of the embodiment. Further, the first bracket 80 is attached into the attaching hole 35 in a direction toward the left end portion of the first attaching member 30 from the right end portion thereof. The first attaching member 30 is formed in such a shape that the part from the width center in the attaching direction of the first bracket 80 over to the left end portion is larger than the other part from the width center over to the right end portion in the attaching direction of the first bracket 80.

Thus, by lengthening each side wall 33 toward the side opposite to the attaching side of the first bracket 80, each side wall 33 can be sufficiently lengthened in the left-right direction while the corresponding side wall 33 is prevented from being interfered with the first bracket 80.

As shown in FIG. 5, in the first attaching member 30 of the vibration proofing device 10 of the embodiment, the side walls 33, 33 project in the attaching direction of the first bracket 80 relative to the top plate 31 and the bottom plate 32.

Thus, by recessing the top plate and the bottom plate relative to the end portions of the side walls, each side wall can be made wider while preventing the first attaching member from increasing the weight thereof.

Thus, by recessing the top plate 31 and the bottom plate 32 relative to the left and right edge portions of the side walls 33 in the left-right direction, each side wall 33 can be made wider in the left-right direction while preventing the first attaching member 30 from increasing the weight thereof.

In the above, the embodiment of the present invention has been described, but the present invention is not limited to the embodiment and can be appropriately changed without departing from the object.

As shown in FIG. 5, in the vibration proofing device 10 of the embodiment, each stopper 51 has a trapezoidal cross section orthogonal to the left-right direction axis, but the shape is not limited to it, and may be a rectangle, a semi-circle or a triangle.

Furthermore, in the vibration proofing device 10 of the embodiment, each stopper 51 is formed of a portion of the insulator 50, but may be formed separately from the insulator 50 and be attached to the corresponding side wall 33 of the first attaching member 30.

As shown in FIG. 3, in the vibration proofing device 10 of the embodiment, both the first edge portion 33a and the second edge portion 33b of each side wall 33 are disposed outside the opening 41a, but only one of the first edge portion 33a and the second edge portion 33b of each side wall 33 may be disposed outside the opening 41a.

In each side wall 33 of the vibration proofing device 10 of the embodiment, the part from the width center over to the left end portion is formed larger than the other part from the width center over to the right end portion in the left-right direction, but the other part from the width center over to the right end portion may be formed larger than the part from the width center over to the left end portion in the left-right direction.

As shown in FIG. 5, in the vibration proofing device 10 of the embodiment, the top plate 31 and the bottom plate 32 are recessed relative to the side walls 33, 33, but the top plate 31, the bottom plate 32, and the side walls 33, 33 may be formed to have the same length as one another.

As shown in FIG. 2, the vibration proofing device 10 of the embodiment is a liquid sealing type having the main liquid chamber 10a and the sub-liquid chamber 10b, but the vibration proofing device 10 is not limited to the liquid sealing type, and may be configured without the main liquid chamber 10a and the sub-liquid chamber 10b.

In the vibration proofing device 10 of the embodiment, the second attaching member 40 is configured with the upper member 41 and the lower member 42, but the upper member 41 and the lower member 42 may be integrated.

As shown in FIG. 3, in the vibration proofing device 10 of the embodiment, the connecting portion 81 of the first bracket 80 is inserted into the attaching hole 35 of the first attaching member 30, but the fixing method of the first bracket 80 and the first attaching member 30 is not particularly limited. For example, the first attaching member 30 may be fixed to the connecting portion 81 of the first bracket 80 with use of a bolt.

The vibration proofing device 10 of the embodiment is interposed between the engine and the vehicle body, but an object for the vibration proofing, to which object the vibration proofing device of the present invention can be applied, is not particularly limited. For example, the object for the vibration proofing may be an inverter or a battery in addition to a prime mover such as an engine or a motor.

Further, the shapes of the first bracket and the second bracket may be appropriately set in accordance with a shape of a device which is an object for the vibration proofing.

DESCRIPTION OF THE SYMBOLS

10 Vibration proofing device
10a Main liquid chamber
10b Sub-Liquid chamber
30 First attaching member
31 Top plate
32 Bottom plate
33 Side wall
33a First edge portion
33b Second edge portion
35 Attaching hole
40 Second attaching member
41 Upper member
41a Opening
42 Lower member
50 Insulator
51 Stopper
60 Partitioning member
61 Orifice passage
62 Elastic movable membrane
70 Diaphragm
80 First bracket
81 Connecting portion
90 Second bracket
91 Top portion
92 Leg portion
93 Bottom portion
93a Opening
94 Right wall portion
95 Internal space

What is claimed is:

1. A vibration proofing device, comprising a first attaching member to be attached to a first bracket; a second attaching member to be attached to a second bracket; and an insulator interposed between the first attaching member and the second attaching member, and the vibration proofing device being disposed in an internal space of the second bracket,
wherein the first attaching member is formed to have two side walls parallel to each other to face an inner face of the second bracket,
wherein the first attaching member has a top plate, a bottom plate, the two side walls, and an attaching hole surrounded by the top plate, the bottom plate and the two side walls, and the first bracket is attached into the attaching hole in an attaching direction from one end portion toward the other end portion of the first attaching member,
wherein the second attaching member is a tubular member having an opening extending in a direction intersecting with the attaching direction,
wherein at least one of side edge portions of each side wall is disposed outside the opening of the second attaching member,
wherein the top plate and the bottom plate are recessed along the attaching direction relative to the side edge portions, and
wherein each side wall is provided on an outer face thereof with a stopper made of an elastic material.

2. The vibration proofing device according to claim 1, wherein the first attaching member is formed in such a shape that a part from a center of a width of the first attaching member in the attaching direction over to the other end portion is larger than the other part from the center over to the one end portion in the attaching direction of the first bracket.

3. The vibration proofing device according to claim 2, wherein the two side walls project in the attaching direction of the first bracket relative to the top plate and the bottom plate.

4. The vibration proofing device according to claim 1, wherein a part of the insulator is disposed in the opening.

5. The vibration proofing device according to claim 1, wherein the first bracket is attached to a prime mover of a vehicle, and the second bracket is attached to a vehicle body of the vehicle.

6. The vibration proofing device according to claim 1, wherein the second bracket is attached to a vehicle body of a vehicle, and the first bracket is attached to a device, to which or from which vibration is to be isolated.

* * * * *